United States Patent Office 3,443,388
Patented May 13, 1969

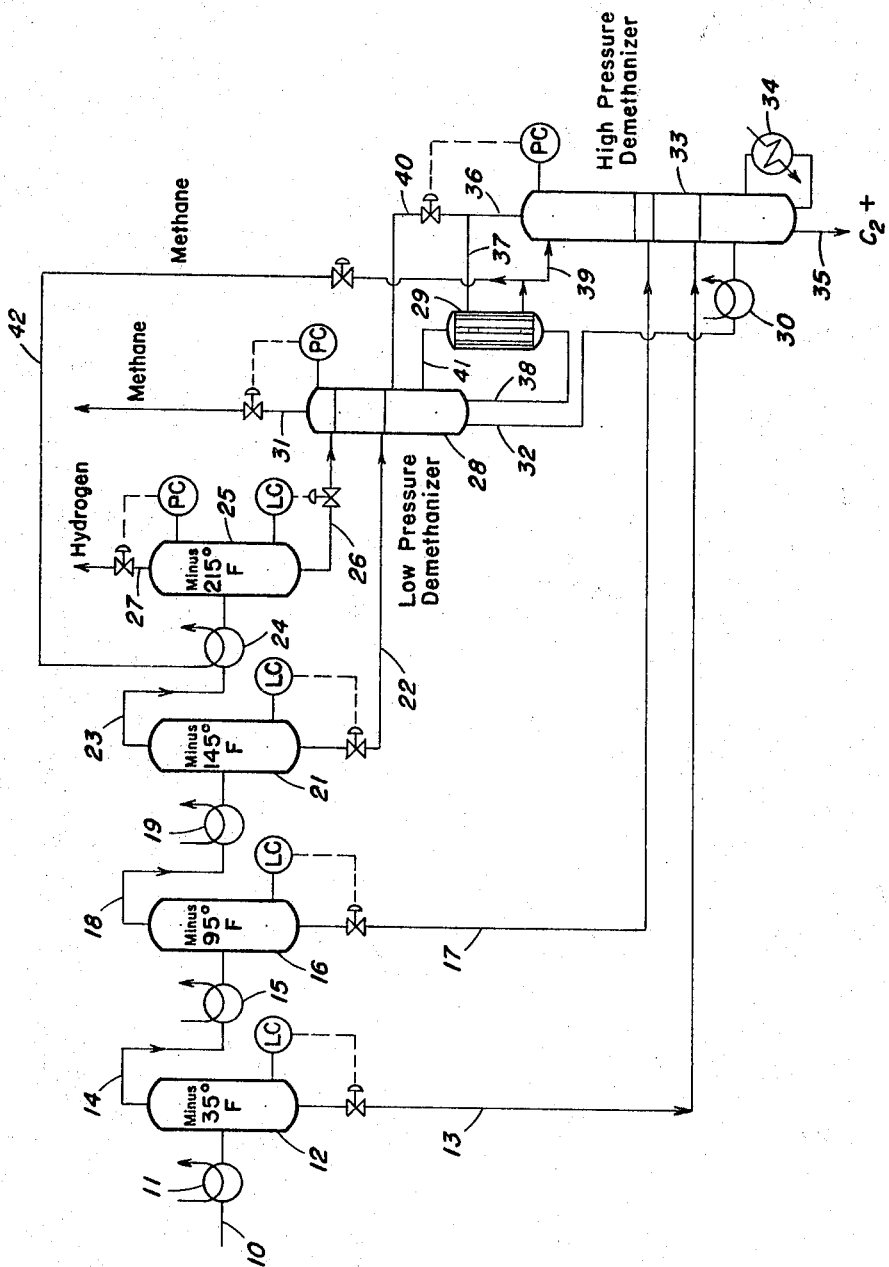

3,443,388
DEMETHANIZATION OF HYDROCARBONS CONDENSED FROM HYDROGEN RICH GAS
Jan Kramer, Voorschoten, and Martinus Hus, Voorburg, Netherlands, assignors to The Lummus Company, New York, N.Y., a corporation of Delaware
Filed June 16, 1967, Ser. No. 646,646
Int. Cl. F25j 3/06; C01b 1/26; C07c 9/04
U.S. Cl. 62—28                              11 Claims

ABSTRACT OF THE DISCLOSURE

A process for separating methane and hydrogen from a gaseous mixture of hydrocarbons wherein the gaseous mixture is cooled in a plurality of stages of successively lower temperatures to effect condensation of a major portion of the gas. A gas primarily comprised of hydrogen is withdrawn from the last stage and the condensate from the last two stages is introduced into a low pressure demethanizer, with the lower temperature condensate being introduced as reflux. The condensate from the remaining stages and the bottoms from the low pressure demethanizer are introduced into a high pressure demethanizer. The heat requirements for the low pressure demethanizer and the cooling requirements for the high pressure demethanizer are met by passing the overhead of the latter in an indirect heat transfer relationship with the bottoms of the former.

---

This invention relates to a process for separating the low boiling components of a gaseous mixture, and in particular, to a process for recovering hydrogen and methane from a gaseous stream.

For many applications, it is highly desirable to recover the two lowest boiling components from a mixture of hydrocarbons. Thus, for example, in the production of olefins, such as ethylene, by the pyrolysis of saturated hydrocarbons, such as ethane, propane, light naphtha and the like, an effluent containing hydrogen, methane and heavier hydrocarbons, such as ethylene, ethane and the like, may be subjected to a low temperature fractionation to recover the various fractions.

In one such process, the pyrolysis gas is chilled in a plurality of stages of sequentially lower temperatures to condense a major portion thereof. The condensate from each stage is introduced into a fractionator operating at a low temperature and high pressure wherein methane, containing some hydrogen, is separated from the condensate and recovered as overhead. The reflux requirements for the fractionator are met by condensing a portion of the overhead withdrawn from the fractionator in a refrigerated condenser and recycling the condensed overhead portion to the top of the fractionator. Since the fractionation is effected at a low temperature, the refrigerated condenser must also be maintained at a low temperature, and consequently, the utilities requirements of the overall process are high.

Accordingly, an object of this invention is to provide a process for separating the lowest boiling components of a gaseous mixture.

Another object of this invention is to reduce the utilities requirements in a process for effecting separation of lowest boiling components from gaseous mixtures.

A further object of this invention is to provide a process for separating hydrogen and methane from a gaseous mixture.

Still another object of this invention is to provide a process which reduces the utilities requirements in effecting a low temperature separation of methane and hydrogen from a gaseous mixture.

A still further object of this invention is to provide an effective process for separating the lowest boiling components of a gas emanating from a pyrolysis heater.

These and other objects should become more readily apparent from the following detailed description of the invention when read with reference to the accompanying drawing which is a schematic flow diagram of an embodiment of the invention.

The objects of this invention are broadly accomplished by cooling a gaseous mixture at an elevated pressure, in a plurality of stages of sequentially lower temperature to effect condensation of a major portion of the gas, with the temperature of the last stage being selected so that the gas withdrawn therefrom is primarily comprised of the lowest boiling component of the gaseous mixture.

The condensate withdrawn from each of the stages, except the last two stages, is introduced into a high pressure fractionator to separate therefrom the next lower boiling component of the gaseous mixture. The condensate withdrawn from the last two stages is introduced into a low pressure fractionator to separate therefrom the next lower boiling component of the gaseous stream with the condensate from the last stage being introduced as reflux to the top of the low pressure fractionator and the condensate from the next to last stage being introduced as feed to the low pressure fractionator.

The two fractionators are operated at a temperature and pressure such that the heat requirements for the low pressure fractionator and the cooling requirements for the high pressure fractionator are met by passing a portion of the bottoms withdrawn from the low pressure fractionator in an indirect heat transfer relationship with a portion of the overhead withdrawn from the high pressure fractionator. The bottoms withdrawn from the low pressure fractionator generally contains quantities of the next higher boiling component of the gaseous mixture, and accordingly, is passed to the high pressure fractionator to effect further separation.

The process of this invention will be further described with reference to the specific embodiment thereof illustrated in the accompanying drawing. Although the process is particularly described with reference to separating methane and hydrogen from a pyrolysis gas, it is to be understood that the process is equally applicable to separating other low boiling components from gaseous mixtures obtained from other sources. It is further to be understood that pumps and the like, have been omitted from the drawing to simplify the description thereof and the use of these equipments and others at appropriate places is deemed to be well within the scope of one skilled in the art. Thus, for example, as illustrated in the drawing the various separators may be provided with level controllers, schematically indicated as LC and the fractionators may be provided with pressure controllers, schematically indicated as PC.

Referring to the drawing, a gaseous stream containing hydrogen, methane, ethylene, ethane, and heavier hydrocarbons, for example from a pyrolysis heater, is passed in line 10 through a cooler 11, provided with a suitable refrigerant such as propylene and/or cold effluent streams as hereinafter described and introduced into a separator 12. As a result of the cooling of the gas in cooler 11, a portion thereof condenses. Condensate, containing heavier hydrocarbons, is withdrawn from separator 12 through line 13 for introduction into a high pressure demethanizer, as hereinafter more fully described.

A gaseous stream containing hydrogen, methane, ethylene, ethane, some propylene, and heavier hydrocarbons is withdrawn from the separator 12 through line 14, passed through a cooler 15, provided with a suitable refrigerant such as ethylene, and/or cold effluent streams as hereinafter described, and introduced into a separator 16. As a result of the additional cooling of the gas in cooler 15, another portion of the gas condenses. Condensate is withdrawn from separator 16 through line 17 for introduction into a high pressure demethanizer, as hereinafter more fully described.

A gaseous stream is withdrawn from separator 16 through line 18, passed through cooler 19, provided with a suitable refrigerant such as ethylene, and/or cold effluent streams as hereinafter described, and introduced into a separator 21. As a result of the further cooling of the gas in cooler 19, an additional portion of the gas condenses. Condensate is withdrawn from separator 21 through line 22 for introduction into a low pressure demethanizer, as hereinafter more fully described.

A gaseous stream, primarily comprised of methane and hydrogen, is withdrawn from the separator 21 through line 23, passed through cooler 24, provided with a suitable refrigerant such as methane, and/or cold effluent streams as hereinafter described, and introduced into a separator 25. As a result of the additional cooling of the gas in cooler 24, another portion of the gas condenses. Condensate is withdrawn from separator 25 through line 26 to meet the reflux requirements for a low pressure demethanizer, as hereinafter more fully described. A hydrogen rich gas is withdrawn from separator 25 through line 27.

The condensate in line 22 is introduced into a low pressure demethanizer 28 to separate methane therefrom. The heat requirements for the low pressure demethanizer 28 are provided by a heat exchanger 29 which also provides the cooling requirements for a high pressure demethanizer, as hereinafter more fully described. A methane rich overhead is withdrawn from low pressure demethanizer 28 through line 31 and this overhead is maintained virtually free of higher boiling hydrocarbons by contact with the condensate introduced as reflux to the top of demethanizer 28 through line 26. It is generally preferable to maximize the quantity of condensate introduced as reflux into the top of low pressure demethanizer 28 through line 26, since this allows a greater quantity of feed to be introduced into low pressure demethanizer 28 through line 22.

A bottoms, still containing appreciable quantities of methane, is withdrawn from low pressure demethanizer 28 through line 32, passed through heat exchanger 30 to recover the caloric potential therefrom, and introduced into a high pressure demethanizer 33 to separate methane therefrom. The heat exchanger 30 may be a portion of one of the hereinabove described refrigeration cycles for effecting cooling of the feed gas between the separators. The condensates in lines 13 and 17, respectively, are introduced at different levels into the high pressure demethanizer 33, with the condensate of higher temperature being introduced at a lower level. The heat requirements for the high pressure demethanizer are provided by a suitable reboiler, generally indicated as 34.

A bottoms containing $C'_2$ and heavier hydrocarbons is withdrawn from high pressure demethanizer 33 through line 35. An overhead, primarily comprised of methane, is withdrawn from high pressure demethanizer 33 through line 36 and a portion thereof passed through line 40 to the low pressure demethanizer 28 as a stripping gas. The remaining portion of the overhead is passed through line 37 and heat exchanger 29 in an indirect heat transfer relationship with a portion of the bottoms withdrawn from low pressure demethanizer 28 through line 38. As a result of the indirect heat transfer in heat exchanger 29, the overhead portion flowing therethrough is condensed and the bottoms portion flowing therethrough is vaporized. The now vaporized bottoms is passed from heat exchanger 29 through line 41 to the low pressure demethanizer and a portion of the now condensed overhead is passed from heat exchanger 29 through line 41 to the high pressure demethanizer 33 to meet the reflux requirements therefor. The remaining portion of the condensed overhead may be expanded in line 42 and employed as the refrigerant in cooler 24.

The following table illustrates specific operating conditions for an embodiment of the process of the invention but the scope of the invention is not to be limited thereby. The low pressure demethanizer operates at a pressure of 80 p.s.i.g., an overhead temperature of $-205°$ F. and a bottoms temperature of $-150°$ F. The high pressure demethanizer operates at a pressure of 395 p.s.i.g. and an overhead temperature of $-140°$ F.

TABLE

[Material balance in moles]

| Comp. | NFF | 1st stg. liquid | 2nd stg. liquid | 2nd stg. vapor | 3rd stg. liquid | 3rd stg. vapor | 4th stg. liquid | 4th stg. vapor | Ovhd. prod. | Btm. prod. |
|---|---|---|---|---|---|---|---|---|---|---|
| | 10 | 13 | 17 | 18 | 22 | 23 | 26 | 27 | 31 | 35 |
| $H_2$ | 2,419.8 | 30.8 | 36.1 | 2,352.9 | 35.0 | 2,317.9 | 39.6 | 2,278.3 | 141.5 | |
| $CH_4$ | 4,051.5 | 584.6 | 519.7 | 2,947.2 | 794.9 | 2,152.3 | 1,586.9 | 565.4 | 3,485.2 | .9 |
| $C_2H_4$ | 4,492.2 | 2,308.1 | 1,278.1 | 906.0 | 703.4 | 202.6 | 198.9 | 3.7 | 1.3 | 4,487.2 |
| $C_2H_6$ | 866.9 | 523.3 | 241.1 | 102.5 | 88.3 | 14.2 | 14.1 | .1 | .1 | 866.7 |
| $C_3H_6$ | 1,387.2 | 1,242.6 | 139.0 | 5.6 | 5.6 | | | | | 1,387.2 |
| $C_3H_8+$ | 361.6 | 348.7 | 12.9 | | | | | | | 361.6 |
| Temp., °F. | | $-35$ | | $-95$ | $-145$ | | $-215$ | | $-205$ | |
| P.s.i.g. | | 500 | | 495 | 485 | | 480 | | 80 | 395 |

The process of this invention is extremely effective for recovering the low boiling components of a gaseous mixture, in particular, hydrogen and methane from a pyrolysis gas. In accordance with the process of the invention, no additional refrigeration is necessary for the demethanizer, thus reducing the overall utilities requirements for the separation, a reduction generally in the order of seven percent or more.

Many modifications and variations of the present invention are possible in the light of the above teachings. It is therefore to be understood, that within the scope of the appended claims, the invention may be practiced otherwise than as specifically described.

What is claimed is:

1. A process for separating low boiling components of a gaseous mixture comprising:
   (a) chilling the gas at stages of successively lower temperature;
   (b) separating liquid condensate from the gas at each chilling stage;
   (c) passing the liquid condensate from at least one lower temperature chilling stage to a first fractionation zone;
   (d) recovering a gas rich in the lowest boiling component from the last chilling stage;
   (e) recovering an overhead rich in the next higher boiling component from the first fractionation zone;
   (f) passing bottoms from said first fractionation zone to a second fractionation zone removed from said first fractionation zone;
   (g) recovering an overhead rich in the next higher boiling component from the second fractionation zone;
   (h) passing a portion of the overhead from the second fractionation zone to a heat exchange zone removed from said first and second fractionation zones in an indirect heat transfer relationship with a portion of a bottoms from the first fractionation zone to effect vaporization of the bottoms portion and condensation of the overhead portion; and (i) introducing at least a portion of the vaporized bottoms portion to the first fractionation zone to meet heat requirements therefor and introducing at least a portion of the condensed overhead into the second fractionation zone to meet refrigeration requirements therefor.

2. The process of claim 1 wherein condensate from the next to lowest temperature chilling stage is introduced as feed to the first fractionation zone.

3. The process of claim 2 wherein the condensate from the lowest temperature chilling stage is introduced as a reflux for the first fractionation zone.

4. The process of claim 3 wherein the second fractionation zone is operated at a higher pressure than the first fractionation zone.

5. The process of claim 4 wherein a portion of the overhead from the second fractionation zone is introduced as a stripping gas into the first fractionation zone.

6. The process of claim 4 wherein the gaseous mixture contains hydrogen, methane, and heavier hydrocarbons.

7. The process of claim 6 wherein a hydrogen rich gas is recovered in the last chilling stage and a methane rich gas is recovered in the first and second fractionation zones.

8. The process of claim 7 wherein the condensate from the higher temperature chilling stages is introduced into the second fractionation zone.

9. The process of claim 8 wherein the condensate withdrawn from each chilling stage and introduced into the second fractionation zone is introduced at different levels, the condensate at the lower temperatures being introduced at a higher level.

10. The process of claim 8 and further comprising passing a portion of the condensed overhead portion to a chilling stage to meet refrigeration requirements therefor.

11. The process of claim 8 wherein there are four chilling stages operated at temperatures of about $-35°$ F., $-95°$ F., $-145°$ F. and $-215°$ F., respectively, the first fractionation zone is operated at a pressure of about 100 p.s.i., an overhead temperature of about $-205°$ F., and a bottoms temperature of about $-150°$ F., and the second fractionation zone is operated at a pressure of about 395 p.s.i. and an overhead temperature of about $-140°$ F.

References Cited
UNITED STATES PATENTS

| | | | |
|---|---|---|---|
| 1,945,367 | 1/1934 | Gobert | 62—29 |
| 2,765,637 | 10/1956 | Etienne. | |
| 2,880,592 | 4/1959 | Davison et al. | 62—28 XR |
| 3,079,759 | 3/1963 | Schilling | 62—29 |
| 3,111,402 | 11/1963 | Cunningham | 62—27 |
| 3,113,854 | 12/1963 | Bernstein | 62—29 XR |
| 3,119,677 | 1/1964 | Moon et al. | 62—23 |
| 3,186,182 | 6/1965 | Grossmann et al. | 62—28 XR |

NORMAN YUDKOFF, *Primary Examiner.*

V. W. PRETKA, *Assistant Examiner.*

U.S. Cl. X.R.

62—23